US010289306B1

(12) United States Patent
Feng et al.

(10) Patent No.: US 10,289,306 B1
(45) Date of Patent: May 14, 2019

(54) DATA STORAGE SYSTEM WITH CORE-AFFINED THREAD PROCESSING OF DATA MOVEMENT REQUESTS

(71) Applicant: EMC IP Holding Company LLC, Hopkinton, MA (US)

(72) Inventors: Changyu Feng, Beijing (CN); Henry Austin Spang, IV, Hopkinton, MA (US); Jian Gao, Beijing (CN); Xinlei Xu, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/884,502

(22) Filed: Jan. 31, 2018

(51) Int. Cl.
*G06F 3/06* (2006.01)
*G06F 9/50* (2006.01)
*G06F 12/0811* (2016.01)

(52) U.S. Cl.
CPC .......... *G06F 3/0608* (2013.01); *G06F 3/061* (2013.01); *G06F 3/065* (2013.01); *G06F 3/067* (2013.01); *G06F 3/0647* (2013.01); *G06F 9/5033* (2013.01); *G06F 12/0811* (2013.01); *G06F 2209/5018* (2013.01); *G06F 2212/283* (2013.01)

(58) Field of Classification Search
CPC ...... G06F 3/0608; G06F 3/061; G06F 3/0647; G06F 3/065; G06F 3/067; G06F 9/5033; G06F 12/0811; G06F 2209/5018; G06F 2212/283
See application file for complete search history.

(56) References Cited

U.S. PATENT DOCUMENTS

| 6,101,533 A * | 8/2000 | Brandt .................... H04L 29/06 709/213 |
| 7,389,403 B1 * | 6/2008 | Alpert ................... G06F 9/3851 712/10 |
| 7,548,898 B1 * | 6/2009 | Tarenskeen ........... G06F 17/303 |
| 8,533,719 B2 * | 9/2013 | Fedorova .............. G06F 9/5033 718/102 |
| 9,485,310 B1 * | 11/2016 | Bono ................. G06F 17/30197 |
| 2006/0129508 A1 * | 6/2006 | Cannon ................. G06F 3/0617 |
| 2013/0151879 A1 * | 6/2013 | Thomson ................ G06F 1/329 713/322 |
| 2015/0309845 A1 * | 10/2015 | Wilson .................... G06F 9/522 718/106 |
| 2017/0185318 A1 * | 6/2017 | Jia ......................... G06F 3/0611 |

* cited by examiner

*Primary Examiner* — Ramon A. Mercado
(74) *Attorney, Agent, or Firm* — BainwoodHuang (57) ABSTRACT

A data storage system has multi-core processing circuitry and processes data movement requests using a multi-threaded library component having an initial operation of invoking an underlying driver to read data, and subsequent operations of copying data, invoking an underlying driver to write data, and initiating additional data movement operations as necessary to complete data movement for an entire range of the data movement request. Core-affined threads are used to execute library component operations for data movement requests of associated per-core queues. Data movement requests are distributed among the per-core queues for parallel processing of the data movement requests by the respective core-affined threads, and the execution of a core-affined thread includes initially starting the thread on the affined core to perform the initial operation, and subsequently re-starting the thread on the affined core to perform each of the subsequent operations.

20 Claims, 8 Drawing Sheets

DATA STORAGE SYSTEM WITH CORE-AFFINED THREAD PROCESSING OF DATA MOVEMENT REQUESTS

BACKGROUND

The present invention is related to the field of data storage systems providing data storage services to host computers via a network.

A data storage system may employ one or more storage processors that execute service applications and other programs to form functional modules that collectively cause the data storage system to provide data storage services to host computers via a network. Services may be file-based (e.g., network attached storage or NAS), block-based (e.g., Fibre Channel or iSCSI block-oriented storage), or virtual-computing based (directly supporting virtualized storage objects such as virtual volumes, etc.).

SUMMARY

Like other processor-based systems, data storage systems may employ so-called "multi-core" processors that include multiple independent instruction execution units sharing the processing load for a single instance of an application program that is executed to provide data storage services. Typically, the cores are realized as separate sections of a monolithic integrated circuit serving as a processing unit having connections to a memory, I/O circuitry, etc. A CPU complex may include one or more such monolithic ICs, yet still be executing only one instance of the application program and operating system.

In current data storage systems, certain data movement (DM) operations carried out by a data movement library (DML) are processed by a dedicated thread which does not have CPU core affinity. In addition, there is only one lock to protect the data from race condition. So, there are the following disadvantages:

1. The single thread is limiting the performance of the DML when doing lots of data copying for DM requests.
2. The single lock causes lock confliction and impacts the performance of DML.
3. DML operations induce undesirable context switching and waste of system resources, including for example L1 and L2 cache space and bandwidth, due to scheduling the dedicated thread on multiple cores over time.

Methods and apparatus are disclosed that can improve the efficiency and performance of a data storage system, in particular efficiency and performance based on the utilization of the processing cores. In particular, the following benefits may be realized:

1. Data Move (DM) requests are processed on multiple cores in parallel, so the data copy is accelerated.
2. DM requests are guarded by multiple locks, reducing lock confliction.
3. Threads are bound to respective cores, and each DM request is processed by the bound thread. This can reduce undesirable context switching and enhance the efficient use of system resources.

More particularly, a method is disclosed of operating a data storage system to process data movement requests, where the data storage system has processing circuitry including one or more multi-core processors each having a respective plurality of processing cores.

The method includes, for each data movement request, executing a multi-threaded library component and underlying device drivers to perform a data movement operation including reading data from a source storage device into a source area of memory, copying data from the source area to a destination area of memory, and writing data from the destination area to a destination storage device. The library component has an initial operation of invoking an underlying driver to initiate the reading of data, and subsequent operations of (1) in response to completion of data reading by an underlying driver, performing the copying of data, (2) invoking an underlying driver to initiate the writing of data, and (3) in response to completion of data writing by an underlying driver, initiating additional data movement operations to complete data movement for an entire range of the data movement request.

Executing the multi-threaded component includes creating per-core queues for holding the data movement requests during processing, each queue uniquely associated with a respective core of the processing circuitry for holding data movement requests being processed by the associated core, and creating per-core threads each being affined to a respective core and being a unit of executable code operable to execute library component operations for data movement requests of the queue associated with the affined core. The data movement requests are distributed among the per-core queues for parallel processing of the data movement requests by the respective core-affined threads. For each data movement request, the respective core-affined thread is executed on only the affined core, including (1) initially starting the thread on the affined core to perform the initial operation, and (2) subsequently re-starting the thread on the affined core to perform each of the subsequent operations.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
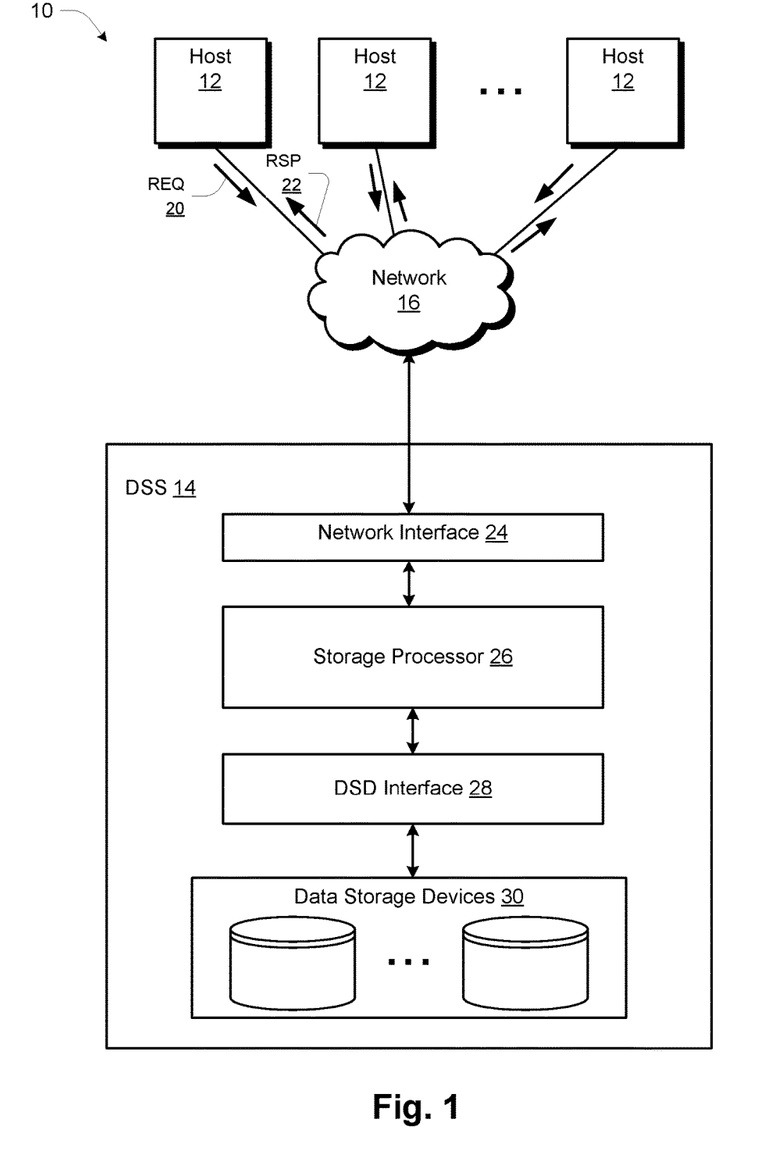
FIG. 1 is a block diagram of a distributed computer system having a data storage system.

FIG. 1 shows a distributed computer system 10 including host computers (HOSTs) 12 and a data storage system (DSS) 14 coupled to a network 16. The DSS 14 provides data storage services to the hosts 12, for example as a file system service making storage visible to the hosts 12 as extensions of their respective host file systems. In this case, communications between the hosts 12 and DSS 14 employs a storage oriented protocol over the network 16 as generally known in the art. In the case of NAS, examples include the Network File System (NFS) and Common Internet File System (CIFS) protocols. For block-oriented storage, iSCSI is an example. For the present description the storage oriented protocol employs requests (REQ) 20 sent by the hosts 12 to the DSS 14, and corresponding responses (RSP 22) returned to the hosts 12 by the DSS 14. The network 16 may be a general-purpose network such as an Internet Protocol (IP) network, or a more storage-oriented network such as a Fibre Channel storage area network (SAN).

The DSS 14 includes a network interface 24, storage processor 26, data storage device (DSD) interface 28, and data storage devices 30. The data storage devices 30 provide nonvolatile read/write data storage, and may be realized as magnetic disks, Flash memory, etc. The network interface 24 provides the physical-layer connection to the network 16, e.g., Ethernet connectivity. The DSD interface 28 provides connection to the data storage devices 30 via a storage-oriented interface such as Small Computer System Interface (SCSI) and Fibre Channel. The storage processor 26 is a high-performance processing complex that provides extensive functionality in software-implemented form, including a high-level protocol endpoint for the storage protocol (e.g., iSCSI, CIFS, etc.), functionality of the data storage service, and use of the data storage devices 30 to provide the underlying data storage for the data storage service.

Figure 2:
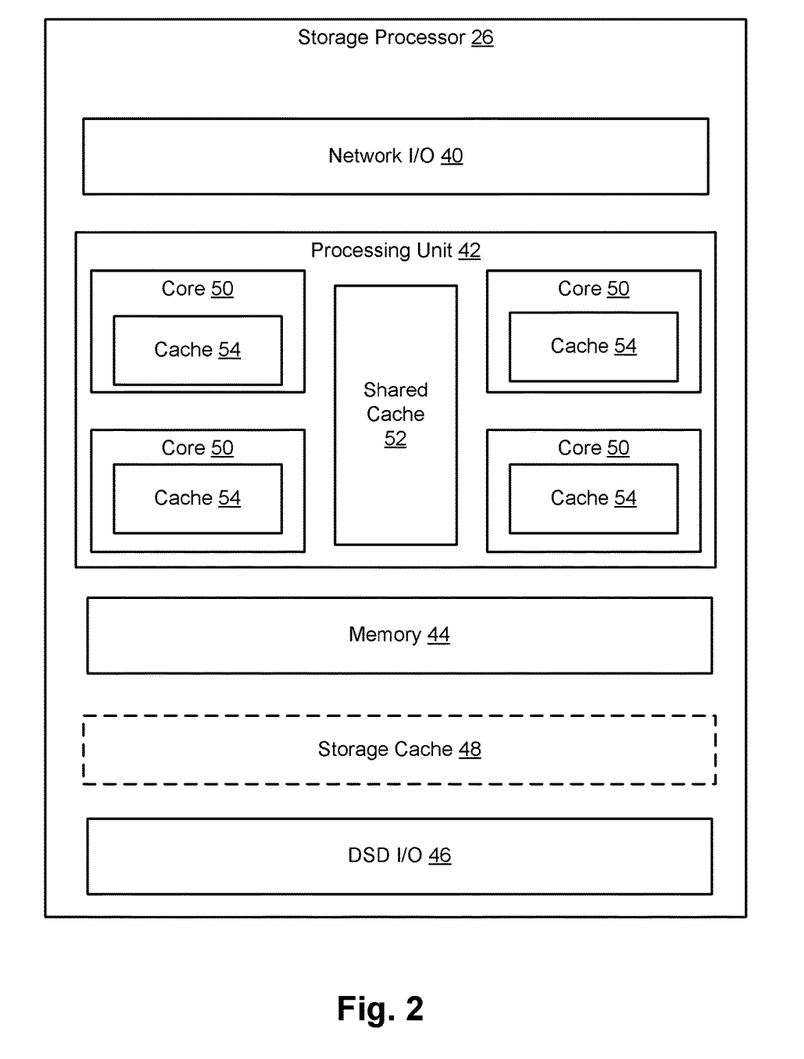
FIG. 2 is a block diagram of a storage processor of a data storage system from a hardware perspective.

FIG. 2 shows the storage processor 26 from a hardware perspective. It includes network input/output (I/O) circuitry 40, a processing unit 42, memory 44, and DSD I/O circuitry 46. It may also include additional memory used as a storage cache 48 (i.e., an in-memory cache of secondary storage objects as stored persistently in the DSDs 30, such as volumes, LUNs, etc.).

The memory 44 is the directly addressable system memory of the processing unit 42. It is commonly realized using high speed dynamic random access memory (DRAM) connected to the processing unit 42 by a high speed data bus (not shown). The network I/O circuitry 40 connects the physical-layer network interface 24 (FIG. 1) to the memory 44 for data transfer therebetween, and similarly the DSD I/O 46 connects the DSD interface 28 to the memory 44 and/or storage cache 48.

The processing unit 42 is of a type known as "multi-core", having multiple independent execution units called "cores" 50. The cores 50 have shared access to the memory 44, typically via a large shared processor cache 52 and smaller respective per-core caches 54. In operation, the cores 50 can simultaneously execute respective streams of instructions and access respective data from the memory 44, under the control of hardware and software mechanisms that manage the use of the cores 50 for a processing workload, such as that of the data storage service as described more below.

The disclosed technique can support several different types of use cases. The following are examples:

1. SCSI extended copy (XCOPY) command.

When cloning or migrating a Virtual Machine, a VM server (e.g., VMware ESX server) will send XCOPYs command to array. Then, a driver on the DSS 14 uses the data movement library (DML—more detail below) to complete the copy.

2. Offload Data Transfer (ODX) command

Windows Server uses Offloaded Data Transfer (ODX) to copy files, and Hyper-V leverages ODX to clone or migrate VMs. After receiving an ODX request, a driver on the DSS 14 leverages DML to finish the copy.

3. Support LUN migration

Data copies are done by DML when migrating a LUN from one pool to another pool, or migrating a LUN from one type to another type (i.e. from compressed LUN to uncompressed LUN)

4. File level Copy on First Write (COFW)

Figure 3:
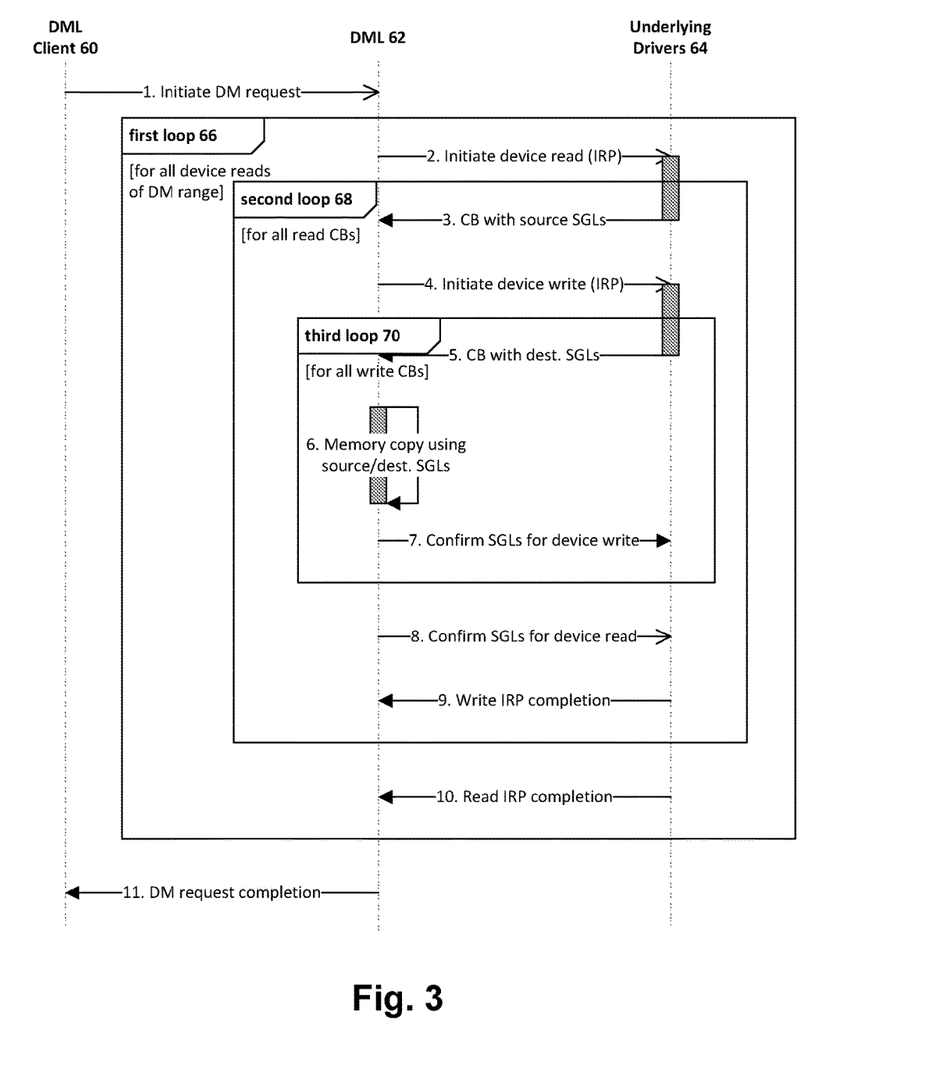
FIG. 3 is a schematic depiction of a multiple-loop method of processing a data movement (DM) request.

FIG. 3 is a schematic depiction of the processing of a data movement (DM) request. Left-to-right are three processing components shown as a data movement library (DML) client 60, a DML component (DML 62), and underlying device drivers 64. DML 62 is a common library used by layered drivers to handle data copying in the DSS 14. A DML client 60 is any higher-level entity that initiates a copy of device data, such as a file system or other component that is tasked with carrying out a command received from a host 12. The underlying drivers 64 can be any of various types, including for example an IO redirector, a mapper layer (MLU), or a device cache. A particular data copy model is depicted and is described further below. This is not necessarily exclusive to other data copy models that a DML might use in a given embodiment.

The following explains the three-loop structure of processing:

1. A first loop 66 is used to break down a DM request into operations on aligned sections, such as 64 Kb in size. Thus, there is iteration of the first loop 66 from step 10 (read IRP completion) back to step 2 (initiate device read (IRP)) to perform as many aligned reads as necessary.

2. A second loop 68 is needed because the underlying drivers may call DML back more than one time for each read IRP, specifically when providing source scatter-gather lists (SGLs) identifying locations in memory where data that has been read from a storage device 30 has been stored. For each callback (CB), DML initiates a device write (IRP) down to underlying drivers, and there is third-loop processing as explained below. The second loop 68 is repeated once for each source SGL CB at step 3.

3. A third loop 70 is similarly needed to handle multiple CBs for the destination SGLs that are provided in response to each write IRP. Each CB at step 5 provides a destination SGL, and DML performs a memory copy (step 6) into the new destination SGL from corresponding source SGL obtained at step 3. This third loop 70 is repeated for each CB at step 5. Being an inner loop, the third loop 70 is repeated by action of the outer second and first loops, resulting in copying the entire range of data from a source storage device 30 to a destination storage device 30 via the in-memory SGLs.

FIG. 3 shows operation for a given DM request. In accordance with general multiprocessing principles, the DSS 14 performs multiple DM requests concurrently for performance and efficiency reasons. As noted above, prior systems have used single-threaded processing and have suffered performance issues as a result. Hence, an important aspect of the present technique is its use of multi-threading, and in particular the use of per-core threads, to realize performance improvements.

Figure 4:
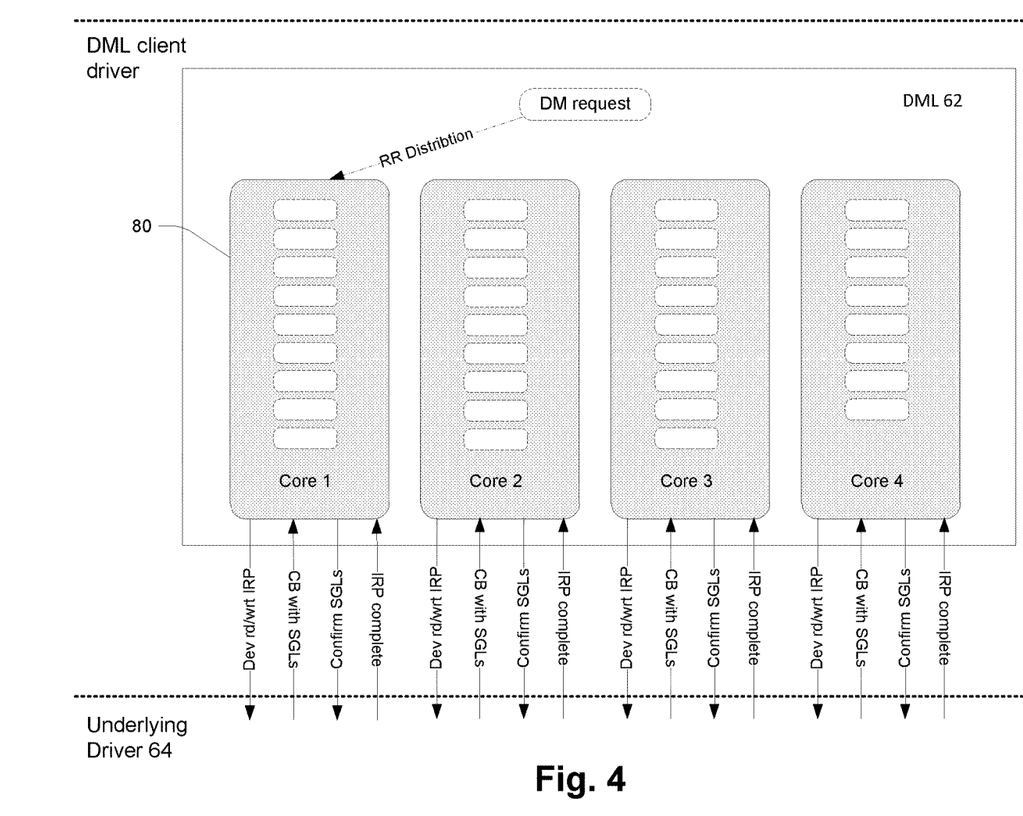
FIG. 4 is a schematic depiction of distributing DM requests among respective queues and threads of a set of processing cores.

FIG. 4 illustrates the multi-threaded aspect generally. In the present technique, per-core queues 80 are used to store DM requests being processed. Each queue 80 is associated with a thread, and each thread is bound to a given core 50 (FIG. 2) by setting the affinity of the thread. There are also per-core locks, each being used to protect the DM requests on the associated queue 80. FIG. 4 shows the distribution of DM requests to the queues 80, using an algorithm such as round-robin (RR) distribution algorithm for example. Once a DM request is assigned to a queue 80, it is then processed by the thread associated with that queue, on the associated core 50.

In some embodiments, it can be specified which core 50 an IRP is forwarded down to underlying drivers, and the underlying drivers complete the IRP back on the same core.

This feature can be used to advantage in the disclosed technique. In some cases, it may not be guaranteed that the device read/write callback is running on the same core 50 (i.e., it may be running on another core 50), but this issue can be addressed by limiting the processing performed by the callback thread (see below) and leaving the main tasks of DM request processing still completed on the main core.

Figure 5:
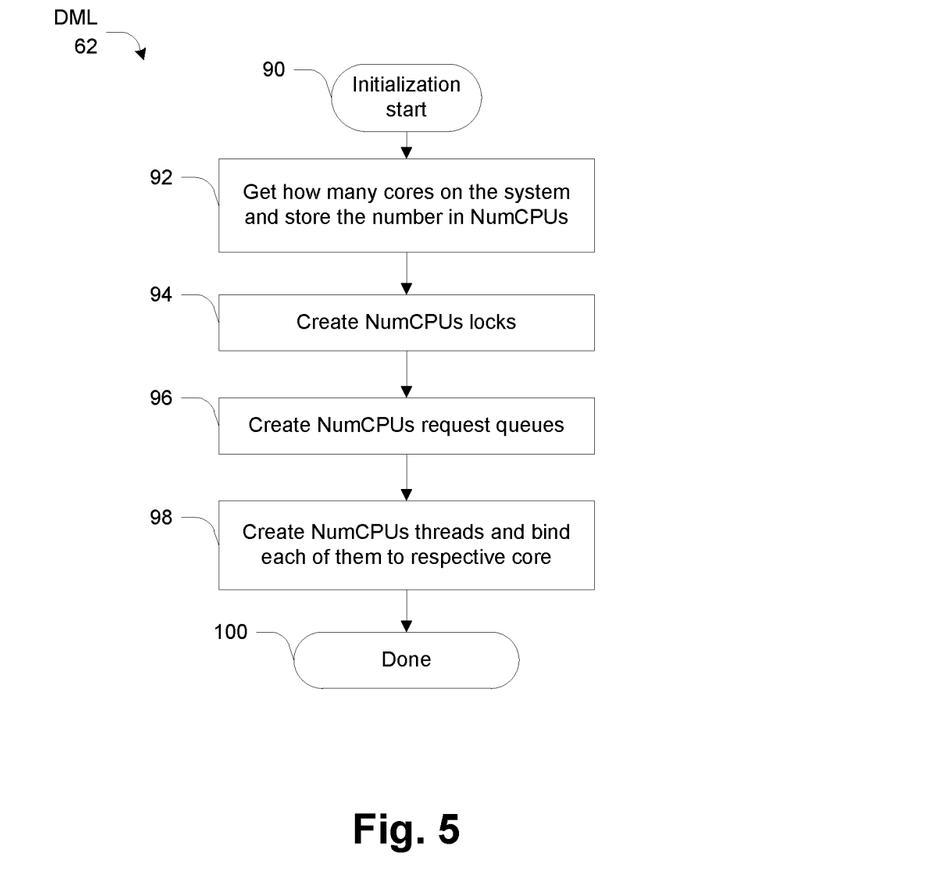
FIG. 5 is a flow diagram of initialization.

FIG. 5 illustrates certain initialization of the DML 62, beginning at 90.

At 92, DML 62 obtains the number of cores 50 in the system and stores this number in a variable NumCPUs. This action can be done using a standard system function call that provides information about the hardware environment.

At 94, DML 62 creates a set or array of locks, of size NumCPUs, establishing one lock per core 50.

At 96, DML 62 creates NumCPUs DM request queues, one per core 50.

At 98, DML 62 creates NumCPUs threads and binds them to respective cores 50. The binding can be performed using a standard function for setting thread affinity. A thread scheduler (not shown) uses this value to assign threads exclusively to their associated cores for execution.

Figure 6:
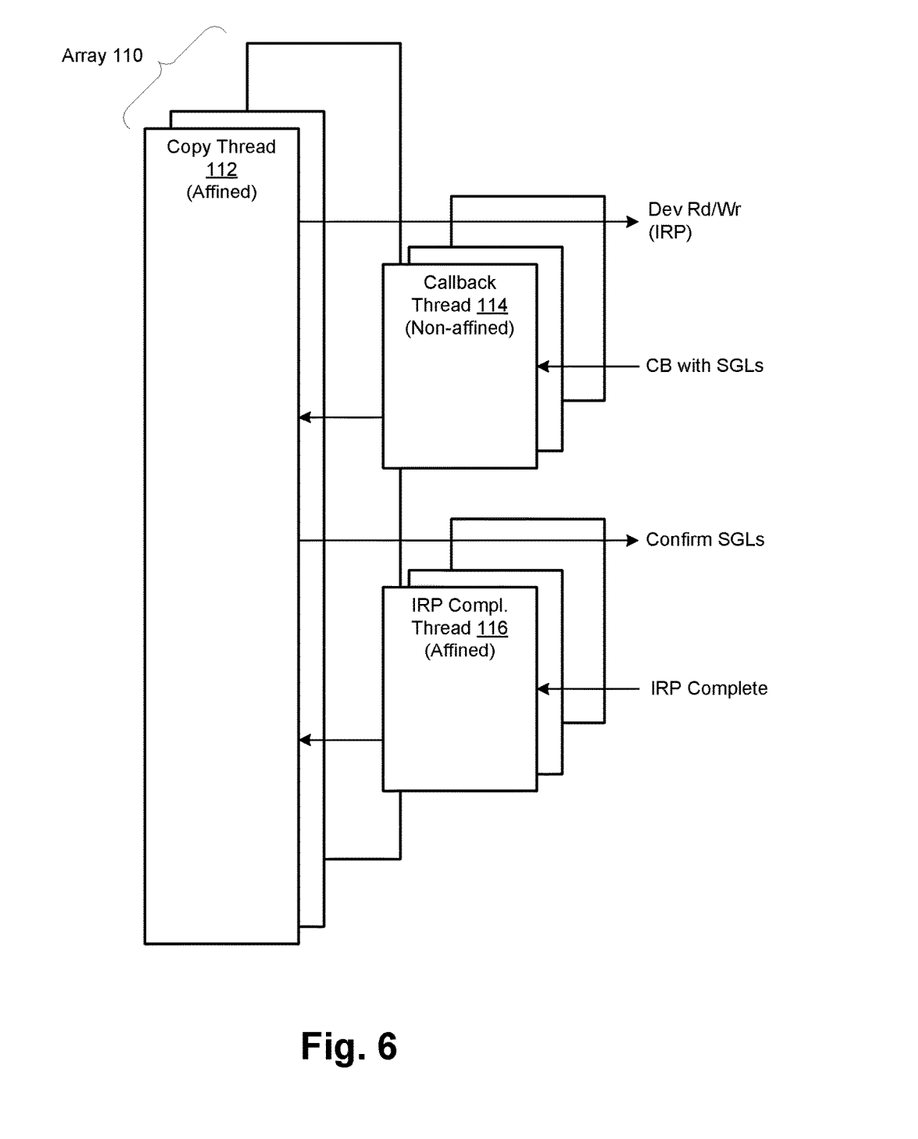
FIG. 6 is a schematic depiction of sets of processing threads.

FIG. 6 shows additional detail about the threads. Three types are employed, and the arrangement is replicated into an array 110 in association with cores 50 as described above. A copy thread 112 is the main execution thread for each DM request. As shown it is core-affined, i.e., bound to a core for its execution. A separate callback thread 114 and IRP completion thread 116 are also employed. The IRP completion thread 116 is also core-affined to the same core as the copy thread 112. As noted above, the callback thread 114 may not be affined to the same core and thus may execute on a different core, depending on the underlying driver 64 that has invoked it.

FIG. 6 shows that the copy thread 112 initiates the device read/write IRPs and sends the SGL confirmations, operations shown as 2, 4, 7 and 8 in FIG. 3. Callback processing is performed by the callback thread 114, in response to callbacks shown at 3 and 5 in FIG. 3. IRP completion processing is performed by the IRP completion thread 116 in response to IRP completions from the underlying drivers 64, shown at 9 and 10 in FIG. 3. These operations are described in more detail below, including the interactions between the copy thread 112 and the callback thread 114 and IRP completion thread 116. As will be appreciated from FIGS. 3, 7 and 8 and related description, the copy thread 112 variably sleeps and awakens throughout the process, as periods of memory copying are interspersed with waiting for the underlying drivers 64 to complete data transfers to/from the storage devices 30 involved in the DM request.

Figure 7:
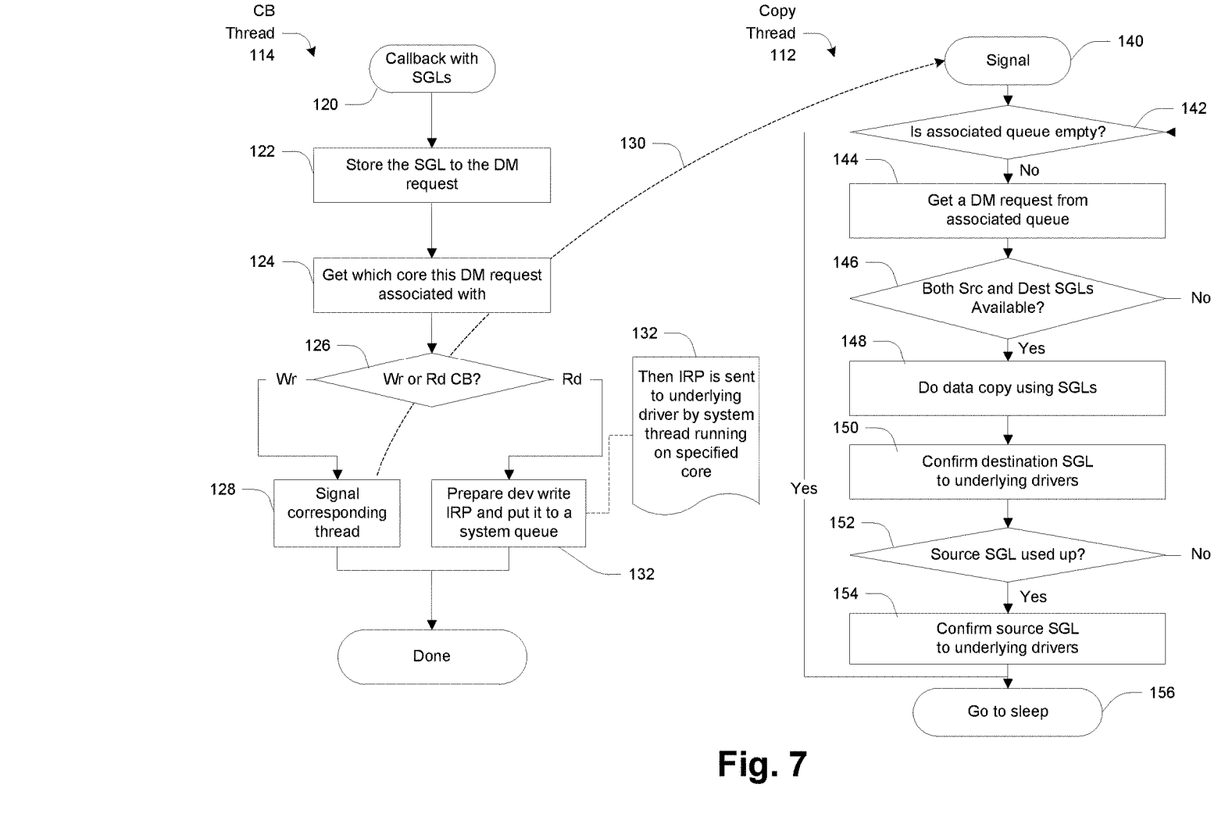
FIG. 7 is a flow diagram of callback processing.

FIG. 7 illustrates callback processing, showing operations of the callback (CB) thread 114 and the copy thread 112. As indicated above, the underlying drivers 64 call back to DML 62 with SGLs for both read IRP and write IRP. Also, it may not be guaranteed that the callback thread 114 runs on the associated core 50 for some underlying drivers. Thus, only certain tasks are performed by the callback thread 114, and then it signals the copy thread 112 associated with the DM request to do the main job. The associated thread runs on the core 50 having the queue 80 to which the DM request was dispatched.

The CB thread processing begins upon receiving a callback at 120, and is as follows:

122—Store SGL in association with the DM request

124—Identify core that DM request assigned to

126—Condition for further processing, whether this is the Write CB (step 5 of FIG. 3) or Read CB (step 3)

128—For a write CB, send a signal 130 to the copy thread 112

132—For a read CB, prepare a write IRP and queue it to underlying driver (step 4 of FIG. 3). This is further explained at 134.

The copy thread processing is performed beginning at 140 in response to receiving the signal 130, and is as follows:

142—Condition for further processing, whether the DM request queue is empty. If so, the copy thread 112 goes to sleep at 156. Otherwise, the remainder of the illustrated processing is performed.

144—Get DM request from queue for this core.

146—Condition further processing on whether both source and destination SGLs are available. If not, then loop back to beginning. Otherwise continue.

148—Do memory copy from source SGLs to destination SGLs (step 6 of FIG. 3).

150—Confirm destination SGL to underlying driver 64 (step 7 of FIG. 3).

152—Condition further processing on whether all of the source SGL has been copied to destination SGLs, i.e., whether more write CBs can be expected. If the source SGL has not been entirely used, then loop back to beginning to wait for more destination SGLs to be obtained (this is a repetition of the third loop 70). Otherwise, continue.

154—Confirm source SGL to underlying driver (step 8 of FIG. 3)

156—Go to sleep.

Figure 8:
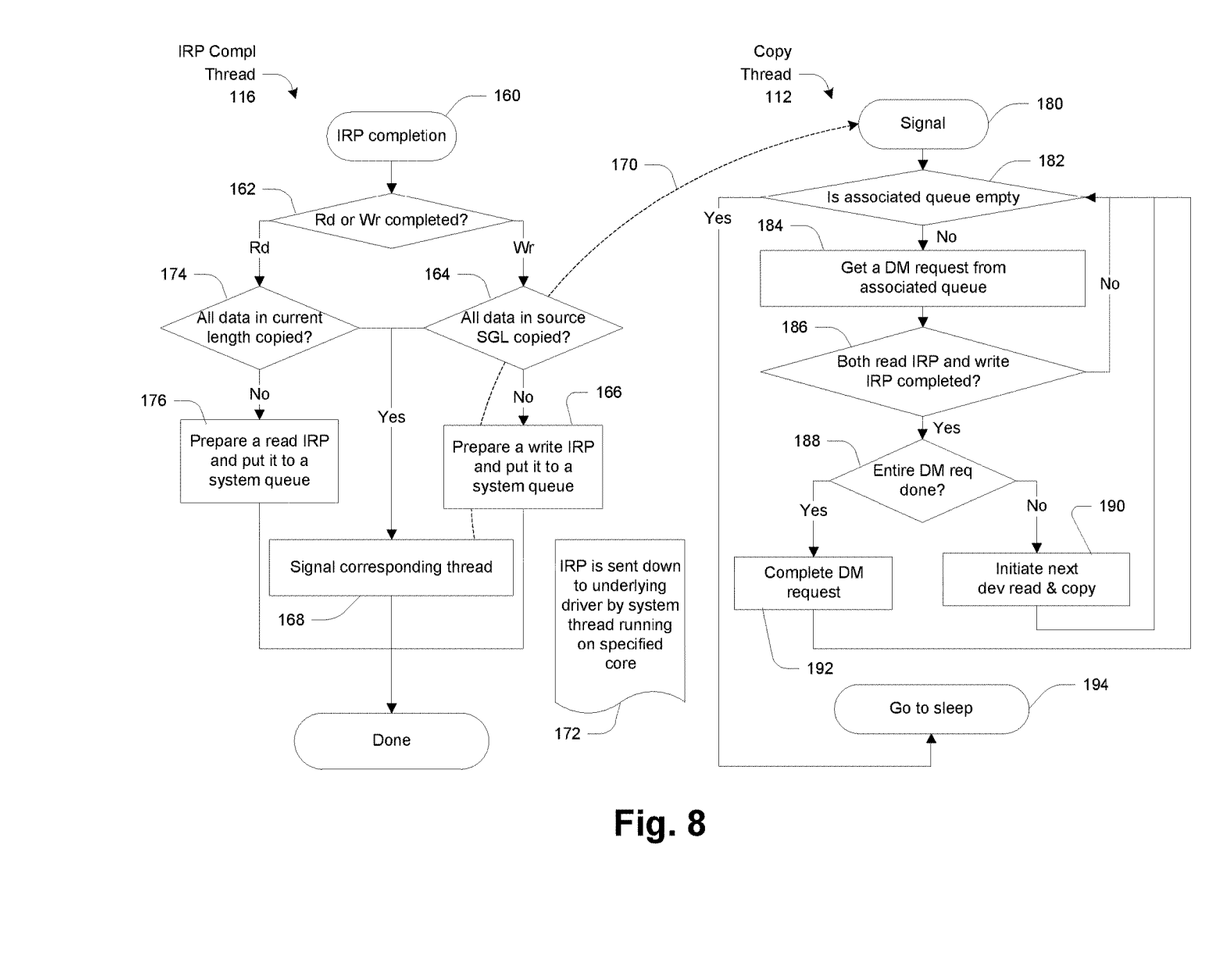
FIG. 8 is a flow diagram of I/O request packet (IRP) completion processing.

FIG. 8 shows IRP completion processing. Both the IRP completion thread 116 and the copy thread 112 run on the core associated with the DM request, so tasks can be done on either thread without adverse performance. To reduce the call stack size and void recursion, it may be preferable to have the IRP completion thread 116 do many of the required tasks and then signal the copy thread 112 for remaining tasks. Such a scheme is shown in FIG. 8.

The IRP completion thread processing begins upon receiving an IRP completion indication at 160, and is as follows:

162—Condition for further processing, whether this is the write IRP completion (step 9 of FIG. 3) or read IRP completion (step 10).

164—Condition for further processing of write IRP completion, whether all the data in the source SGL has been copied. If not, then processing proceeds to 166 where another write IRP is initiated (step 4 of FIG. 3), and otherwise to 168 where a signal 170 is sent to the copy thread 112. The No branch of 164 and the step 166 correspond to a repetition of the second loop 68 (FIG. 3).

166—Prepare another write IRP and send it to the underlying driver 64 via a system queue. This is further explained at 172.

168—Generate signal 170 to copy thread 112 that IRP completion process is done. This represents the end of looping for the second loop 68 (write IRP) and for the first loop 66 (read IRP) of FIG. 3.

174—Condition further processing on whether all the data of the current DM request has been copied. If not, then processing proceeds to 176 where another read IRP is initiated (step 2 of FIG. 3), and otherwise to 168 where a signal 170 is sent to the copy thread 112. The No branch of 174 and the step 176 correspond to a repetition of the first loop 66 (FIG. 3).

176—Prepare another read IRP and send it to the underlying driver 64 via a system queue. This is further explained at 172.

The copy thread processing is performed beginning at 180 in response to receiving the signal 170, and is as follows:

182—Condition for further processing, whether the DM request queue is empty. If so, the copy thread 112 goes to sleep at 194. Otherwise, the remainder of the illustrated processing is performed.

184—Get DM request from queue for this core.

186—Condition further processing on whether both the read and write IRPs are complete for this request. If not, then loop back to beginning. Otherwise continue.

188—Condition further processing on whether the entire DM request is done. If not, then at 190 a next device read and copy are initiated for the current DM request, and otherwise the processing for this DM request is completed at 192 and the process returns to 182 to process any other DM requests that might require IRP completion processing.

190—Initiate next device read and copy

192—Complete DM request

194—go to sleep

From the description above, the following advantages are apparent:

1. DM requests are processed on multiple cores in parallel, so the data copy is accelerated.

2. DM requests are guarded by multiple locks; it will reduce the lock confliction. 3. Threads are bound to cores. Each DM request is processed by the associated thread, and thus the processing can avoid context switching and unnecessary data transfers between L1 and L2 CPU caches, enhancing efficient use of system resources.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system to process data movement requests, the data storage system having processing circuitry including one or more multi-core processors each having a respective plurality of processing cores, comprising:

for each data movement request, executing a multi-threaded library component and underlying device drivers to perform a data movement operation including reading data from a source storage device into a source area of memory, copying data from the source area to a destination area of memory, and writing data from the destination area to a destination storage device, the library component having an initial operation of invoking an underlying driver to initiate the reading of data, and having subsequent operations of (1) in response to completion of data reading by an underlying driver, performing the copying of data, (2) invoking an underlying driver to initiate the writing of data, and (3) in response to completion of data writing by an underlying driver, initiating additional data movement operations to complete data movement for an entire range of the data movement request, wherein executing the multi-threaded component includes:

creating per-core queues for holding the data movement requests during processing, each queue uniquely associated with a respective core of the processing circuitry for holding data movement requests being processed by the associated core;

creating per-core threads each being affined to a respective core and being a unit of executable code operable to execute library component operations for data movement requests of the queue associated with the affined core;

distributing the data movement requests among the per-core queues for parallel processing of the data movement requests by the respective core-affined threads; and for each data movement request, executing the respective core-affined thread on only the affined core, including (1) initially starting the thread on the affined core to perform the initial operation, and (2) subsequently re-starting the thread on the affined core to perform each of the subsequent operations.

2. The method of claim 1, wherein each core-affined thread has a multi-loop structure having three loops, a first loop iterating over aligned sub-ranges of a complete range of the data movement request, a second loop iterating over multiple read callbacks by which all data of a given sub-range is copied from the source storage device into memory, and a third loop iterating over multiple write callbacks by which all data for a given read callback is copied from memory to the destination storage device.

3. The method of claim 2, wherein each iteration of the first loop includes sending a read I/O request packet (IRP) to an underlying driver and receiving a corresponding IRP completion from the underlying driver after the second and third loops have been executed, the sending of the read IRP initiating action of the underlying driver that in turn initiates execution of the second and third loops.

4. The method of claim 3, wherein each iteration of the second loop includes (1) receiving a corresponding read callback from the underlying driver identifying a respective source scatter-gather list (SGL) storing data from the source storage device, the read callbacks occurring in response to the read IRP, (2) sending a write IRP to an underlying driver to initiate a writing operation to the destination storage, the sending of the write IRP initiating action of the underlying driver that in turn initiates execution of the third loop, (3) upon completion of the third loop, confirming the source SGL to the underlying driver, resulting in the underlying driver subsequently sending a write IRP completion that terminates the iteration of the second loop.

5. The method of claim 4, wherein each iteration of the third loop includes (1) receiving a corresponding write callback from the underlying driver identifying a respective destination SGL to store data to be written to the destination storage device, the write callbacks occurring in response to the write IRP, (2) copying data from the source SGL to the destination SGL, and (3) confirming the destination SGL to the underlying driver.

6. The method of claim 1, wherein each per-core thread is one of a set of threads collectively realizing implementing operations of the library component for a DM request, the set of threads including a copy thread, a callback thread, and an I/O request packet (IRP) completion thread, the copy thread being core-affined and being a main execution thread for each DM request, the IRP completion thread also being core-affined and performing IRP completion processing in response to completion of a read IRP and a write IRP initiated by the copy thread, the callback thread performing callback processing in response to a read callback and a write callback from the underlying drivers identifying the source area and destination area of memory for the data copying, both the callback thread and the IRP completion thread generating respective signals to awaken the copy thread to resume operation on a DM request after processing of a callback and IRP completion respectively are completed.

7. The method of claim 6, wherein the callback thread is not core-affined and executes on a core other than the core on which the copy thread and IRP completion thread execute, and operation of the callback thread for a given data movement request includes (1) identifying which core the data movement request is assigned to, and (2) generating the signal to the copy thread affined to the core to which the data movement request is assigned.

8. The method of claim 6, wherein the callback processing of the callback thread includes:
   storing a source scatter-gather list (SGL) in association with the data movement request;
   for a write callback, sending a signal to the copy thread to initiate data copying from the source area to the destination area; and
   for a read callback, prepare a write IRP and send it to the underlying driver.

9. The method of claim 8, wherein the copy thread responds to the signal by:
   determining whether both source and destination SGLs are available; and
   in response to both source destination SGLs being available:
      performing a memory copy from source SGL to destination SGL;
      confirming the destination SGL to the underlying driver;
      determining whether all of the source SGL has been copied to a destination SGL, and if not then looping back to beginning to wait for more destination SGLs to be obtained; and
      if all of the source SGL has been copied to a destination SGL, then confirming the source SGL to the underlying driver.

10. The method of claim 6, wherein the IRP completion processing of the IRP completion thread includes:
    for a write IRP completion:
       (1) determining whether all the data in a source scatter-gather list (SGL) has been copied, and if not then preparing another write IRP and sending it to the underlying driver;
       (2) if all the data in a source scatter-gather list (SGL) has been copied, then sending the signal the copy thread to await a read IRP completion; and
    for a read IRP completion:
       (1) determining whether all the data of the current data movement request has been copied, and if not then preparing another read IRP and sending it to the underlying driver; and
       (2) if all the data of the current data movement request has been copied, then sending the signal the copy thread to complete the processing of the data movement request.

11. The method of claim 10, wherein the copy thread responds to the signal by:
    determining whether both the read IRP and write IRP are complete for a sub-range of the data movement request, and if not then awaiting completion of both the read IRP and write IRP;
    if both the read IRP and write IRP are complete for the sub-range of the data movement request, then determining whether the processing for the entire data movement request has been performed, and if not then initiating additional device read and copy operations to complete the data movement request.

12. A data storage system having data storage devices and processing circuitry, the processing circuitry including one or more multi-core processors each having a respective plurality of processing cores, the processing circuitry executing computer program instructions to cause the data storage system to process data movement requests by:
   for each data movement request, executing a multi-threaded library component and underlying device drivers to perform a data movement operation including reading data from a source storage device into a source area of memory, copying data from the source area to a destination area of memory, and writing data from the destination area to a destination storage device, the library component having an initial operation of invoking an underlying driver to initiate the reading of data, and having subsequent operations of (1) in response to completion of data reading by an underlying driver, performing the copying of data, (2) invoking an underlying driver to initiate the writing of data, and (3) in response to completion of data writing by an underlying driver, initiating additional data movement operations to complete data movement for an entire range of the data movement request,
   wherein executing the multi-threaded component includes:
      creating per-core queues for holding the data movement requests during processing, each queue uniquely associated with a respective core of the processing circuitry for holding data movement requests being processed by the associated core;
      creating per-core threads each being affined to a respective core and being a unit of executable code operable to execute library component operations for data movement requests of the queue associated with the affined core;
      distributing the data movement requests among the per-core queues for parallel processing of the data movement requests by the respective core-affined threads; and
      for each data movement request, executing the respective core-affined thread on only the affined core, including (1) initially starting the thread on the affined core to perform the initial operation, and (2) subsequently re-starting the thread on the affined core to perform each of the subsequent operations.

13. The data storage system of claim 12, wherein each core-affined thread has a multi-loop structure having three loops, a first loop iterating over aligned sub-ranges of a complete range of the data movement request, a second loop iterating over multiple read callbacks by which all data of a given sub-range is copied from the source storage device into memory, and a third loop iterating over multiple write callbacks by which all data for a given read callback is copied from memory to the destination storage device.

14. The data storage system of claim 13, wherein each iteration of the first loop includes sending a read I/O request packet (IRP) to an underlying driver and receiving a corresponding IRP completion from the underlying driver after the second and third loops have been executed, the sending of the read IRP initiating action of the underlying driver that in turn initiates execution of the second and third loops.

15. The data storage system of claim 14, wherein each iteration of the second loop includes (1) receiving a corresponding read callback from the underlying driver identifying a respective source scatter-gather list (SGL) storing data from the source storage device, the read callbacks occurring in response to the read IRP, (2) sending a write IRP to an underlying driver to initiate a writing operation to the destination storage, the sending of the write IRP initiating action of the underlying driver that in turn initiates execution of the third loop, (3) upon completion of the third loop, confirming the source SGL to the underlying driver, resulting in the underlying driver subsequently sending a write IRP completion that terminates the iteration of the second loop.

16. The data storage system of claim 15, wherein each iteration of the third loop includes (1) receiving a corresponding write callback from the underlying driver identifying a respective destination SGL to store data to be written to the destination storage device, the write callbacks occurring in response to the write IRP, (2) copying data from the source SGL to the destination SGL, and (3) confirming the destination SGL to the underlying driver.

17. The data storage system of claim 12, wherein each per-core thread is one of a set of threads collectively realizing implementing operations of the library component for a DM request, the set of threads including a copy thread, a callback thread, and an I/O request packet (IRP) completion thread, the copy thread being core-affined and being a main execution thread for each DM request, the IRP completion thread also being core-affined and performing IRP completion processing in response to completion of a read IRP and a write IRP initiated by the copy thread, the callback thread performing callback processing in response to a read callback and a write callback from the underlying drivers identifying the source area and destination area of memory for the data copying, both the callback thread and the IRP completion thread generating respective signals to awaken the copy thread to resume operation on a DM request after processing of a callback and IRP completion respectively are completed.

18. The data storage system of claim 17, wherein the callback thread is not core-affined and executes on a core other than the core on which the copy thread and IRP completion thread execute, and operation of the callback thread for a given data movement request includes (1) identifying which core the data movement request is assigned to, and (2) generating the signal to the copy thread affined to the core to which the data movement request is assigned.

19. The data storage system of claim 17, wherein the callback processing of the callback thread includes:
  (1) storing a source scatter-gather list (SGL) in association with the data movement request;
  (2) for a write callback, sending a signal to the copy thread to initiate data copying from the source area to the destination area; and
  (3) for a read callback, prepare a write IRP and send it to the underlying driver;
and wherein the copy thread responds to the signal by:
  (1) determining whether both source and destination SGLs are available; and
  (2) in response to both source destination SGLs being available:
    performing a memory copy from source SGL to destination SGL;
    confirming the destination SGL to the underlying driver;
    determining whether all of the source SGL has been copied to a destination SGL, and if not then looping back to beginning to wait for more destination SGLs to be obtained; and
    if all of the source SGL has been copied to a destination SGL, then confirming the source SGL to the underlying driver.

20. The data storage system of claim 17, wherein the IRP completion processing of the IRP completion thread includes:
  for a write IRP completion:
    (1) determining whether all the data in a source scatter-gather list (SGL) has been copied, and if not then preparing another write IRP and sending it to the underlying driver;
    (2) if all the data in a source scatter-gather list (SGL) has been copied, then sending the signal the copy thread to await a read IRP completion; and
  for a read IRP completion:
    (1) determining whether all the data of the current data movement request has been copied, and if not then preparing another read IRP and sending it to the underlying driver; and
    (2) if all the data of the current data movement request has been copied, then sending the signal the copy thread to complete the processing of the data movement request;
and wherein the copy thread responds to the signal by:
  (1) determining whether both the read IRP and write IRP are complete for a sub-range of the data movement request, and if not then awaiting completion of both the read IRP and write IRP;
  (2) if both the read IRP and write IRP are complete for the sub-range of the data movement request, then determining whether the processing for the entire data movement request has been performed, and if not then initiating additional device read and copy operations to complete the data movement request.

* * * * *